United States Patent
Lin et al.

(10) Patent No.: US 8,194,755 B2
(45) Date of Patent: Jun. 5, 2012

(54) BIT STREAM BUFFER CONTROLLER AND ITS METHOD

(75) Inventors: Chan-Shih Lin, Tainan (TW); Yin-Her Su, Tainan (TW)

(73) Assignee: Himax Media Solutions, Inc., Sinshih Township, Tainan County (TW)

( * ) Notice: Subject to any disclaimer, the term of this patent is extended or adjusted under 35 U.S.C. 154(b) by 509 days.

(21) Appl. No.: 12/399,525

(22) Filed: Mar. 6, 2009

(65) Prior Publication Data
US 2010/0226442 A1   Sep. 9, 2010

(51) Int. Cl.
*H04B 1/00* (2006.01)
*H04N 1/64* (2006.01)

(52) U.S. Cl. ........... 375/240.25; 375/240.01; 375/240.2; 375/240.26; 375/240.27; 375/240.28

(58) Field of Classification Search . 375/240.01–240.29
See application file for complete search history.

(56) References Cited

U.S. PATENT DOCUMENTS

| | | | | |
|---|---|---|---|---|
| 4,888,739 A * | 12/1989 | Frederick et al. | | 365/221 |
| 5,521,918 A * | 5/1996 | Kim | | 370/428 |
| 5,850,258 A * | 12/1998 | Kang | | 375/240.01 |
| 6,621,428 B1 * | 9/2003 | Crane | | 341/60 |
| 2006/0209709 A1* | 9/2006 | Kovacevic | | 370/252 |
| 2007/0030911 A1* | 2/2007 | Yoon | | 375/240.25 |
| 2007/0285287 A1* | 12/2007 | Hussain et al. | | 341/50 |

* cited by examiner

*Primary Examiner* — Joseph Ustaris
*Assistant Examiner* — On S Mung
(74) *Attorney, Agent, or Firm* — Baker & McKenzie LLP

(57) ABSTRACT

A bit-stream buffer controller for a video decoder includes a first FIFO, a second FIFO, and an interrupt controller. The first FIFO is configured to store an input bit-stream. The second FIFO is configured to store a payload extracted from the input bit-stream. The interrupt controller is configured to generate an interrupt signal according to a fullness status of the first FIFO and the second FIFO such that the video decoder may be switched to load the payload without checking the fullness status each time the payload is loaded.

20 Claims, 3 Drawing Sheets

BIT STREAM BUFFER CONTROLLER AND ITS METHOD

FIELD OF THE INVENTION

The present invention is related to a video decoder and particularly to a bit-stream buffer controller and its method for use in a H.264/AVC decoder.

BACKGROUND OF THE INVENTION

FIFO (First-in, First-Out) is used commonly in a bit-stream controller of a video decoder for buffering and flow control. It is often implemented as a circular queue, and thus has read and write pointers. Initially, both the read and write pointers are at the same memory location and the FIFO queue is empty. Conventionally, the video decoder must query FIFO empty status first to ensure the validity of stored data each time it reads the data, thus reducing the efficiency of the video decoder.

Therefore, there is a need for a bit-stream buffer controller which can refrain the video decoder from unnecessarily querying for FIFO empty status.

SUMMARY OF THE INVENTION

The present invention provides an efficient bit-stream buffer controller with flexible bit-stream empty status check function.

A bit-stream buffer controller for a video decoder includes a first FIFO, a second FIFO, and an interrupt controller. The first FIFO is configured to store an input bit-stream. The second FIFO is configured to store a payload extracted from the input bit-stream. The interrupt controller is configured to generate an interrupt signal according to a fullness status of the first FIFO and the second FIFO such that the video decoder may be switched to load the payload without checking the fullness status each time the payload is loaded.

A bit stream buffer controlling method for a video decoder includes receiving and storing an input bit-stream in a first FIFO, extracting and storing a payload extracted from the input bit-stream in a second FIFO, and generating an interrupt signal according to a fullness status of the first FIFO and the second FIFO to switch the video decoder to load the payload between a check mode and a no-check mode to reduce a frequency to check the fullness status of the video decoder.

Advantageously, by generating appropriate empty interrupt and maintain a SW function pointer, the present invention allows the processor to check the status flag only if interrupt is triggered. That is, the bit-stream can be accessed without querying FIFO status flag, and improved processing efficiency can be achieved.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the principles disclosed herein, and the advantages thereof, reference is now made to the following descriptions taken in conjunction with the accompanying drawings, in which.

DESCRIPTION OF EMBODIMENTS OF THE INVENTION

Embodiments of the present invention are hereinafter described with reference the drawings.

Figure 1:
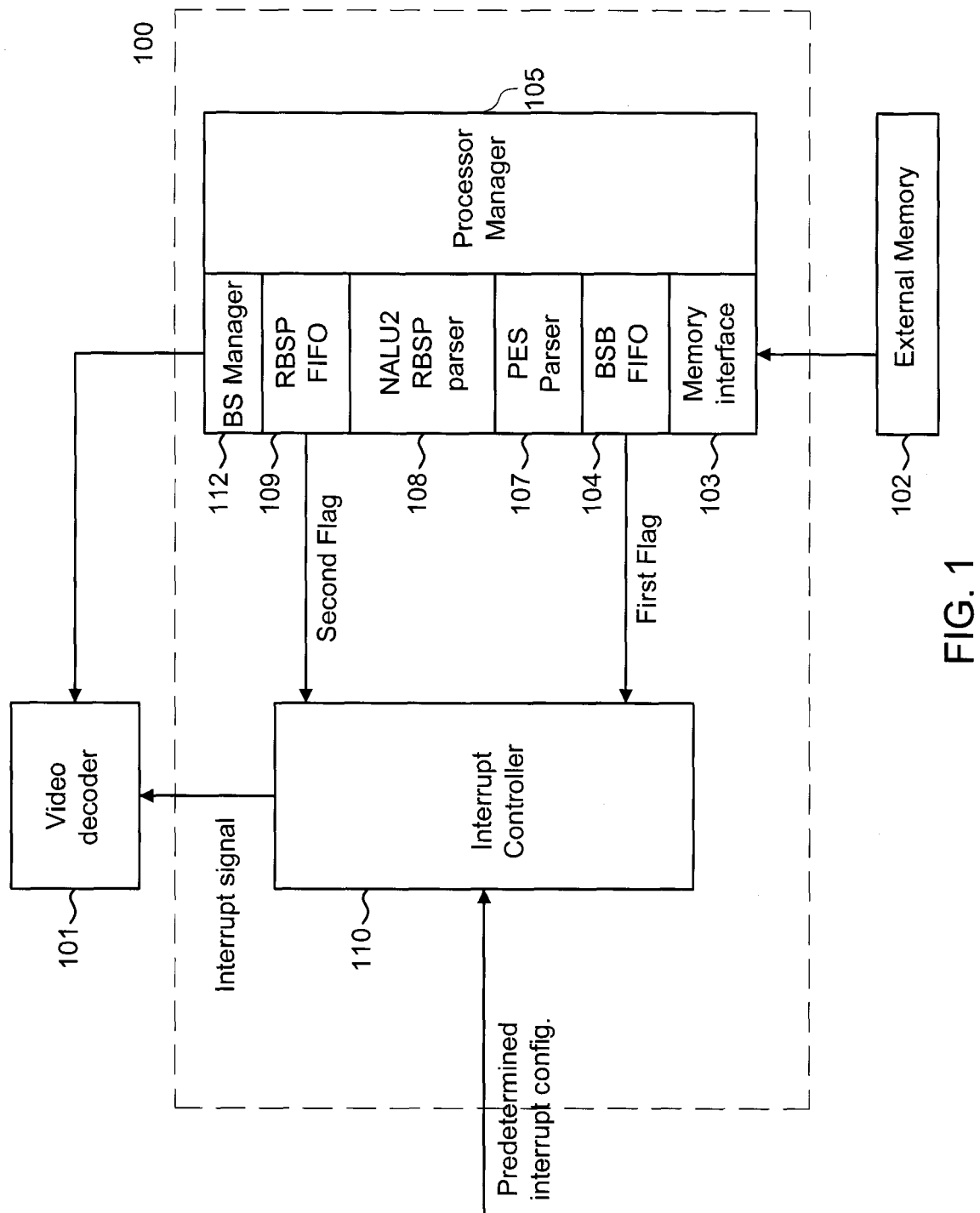
FIG. 1 is a block diagram showing the configuration of a bit-stream buffer controller associated with one embodiment of the present invention.

FIG. 1 is a block diagram showing the configuration of a bit-stream buffer controller 100 associated with one embodiment of the present invention. This bit-stream buffer controller 100 is capable of preventing a video decoder 101, such as a H.264/AVC decoder, from unnecessarily checking a FIFO empty status.

The bit-stream buffer controller 100 comprises a memory interface 103, a bit-stream buffer (BSB) FIFO 104, a process manager 105, a PES parser 107, a NALU2RBSP parser 108, a raw byte sequence payload (RBSP) FIFO 109, an interrupt controller 110 and a bit-stream (BS) manager 112. The bit-stream buffer controller 100 is configured to receive a bit-stream, either in PES format or in ES format, from, for example, an external memory 102 and further to output an interrupt signal to have the video decoder 101 switched to load a raw byte sequence payload (RBSP) that is extracted from the bit-stream and stored in the RBSP FIFO 109 either in check mode or in no-check mode. In check mode, the video decoder 101 is programmed to check the fullness status of the RBSP FIFO 109 each time it loads the RBSP that is stored in the RBSP FIFO 109. On the contrary, in no-check mode, the video decoder 101 is programmed not to check the fullness status of the RBSP FIFO 109 each time it loads the RBSP that is stored in the RBSP FIFO 109.

It is now assumed that a bit-stream is supplied from the external memory 102. The memory interface 103 connects the external memory 102 with the BSB FIFO 104. The process manager 105 controls the BSB FIFO 104 to load the bit-stream, either in PES or in ES format, from the external memory 102 via the memory interface 103. Preferably, the external memory 102 is a Double Data Rate Synchronous Dynamic Random Access Memory (DDR SRAM) and controlled by a DDR controller (not shown). In the present embodiment, the BSB FIFO 104 can generate a first flag. The first flag may indicate five types of status, that is, empty, almost empty, half full, almost full, or full, of the BSB FIFO 104, but it may generate more or fewer types of status in alternative embodiments.

The PES parser 107 is configured to extract an ES format payload from the bit-stream stored in the BSB FIFO 104 if the bit-stream that is stored in the BSB FIFO 104 is in PES format In alternative embodiments, the PES parser 107 can also bypass the inputted bit-stream to the following stage, that is, the NALU2RBSP parser 108 if the bit-stream that is stored in the BSB FIFO 104 is in PES format. In the present embodiment, the PES parser 107 may also extract Presentation Time Stamp (PTS) and/or Decode Time Stamp (DTS) information in the bit-stream in PES format for use in the following video decoding.

Following the PES parser 107, the NALU2RBSP parser 108 is configured to remove an emulation_prevention_three_byte (0*00_00_03) of the ES format payload extracted by the PES parser 107 or the ES format bit-stream stored in the BSB FIFO 104 to extract the RBSP.

The RBSP FIFO 109 is configured to load the RBSP extracted by the NALU2RBSP parser 108. In the present embodiment, the RBSP FIFO 109 can generate a second flag. The second flag may indicate five types of status, that is, empty, almost empty, half full, almost full, or full, of the RBSP FIFO 109, but it may generate more or fewer types of status in alternative embodiments.

Furthermore, the BS manager 112 is configured to shift out the RBSP that is stored in the RBSP FIFO 109 to the video decoder 101 according to the syntax requirement.

The interrupt controller 111 is configured to refrain the processor 101 from unnecessarily checking the FIFO empty status. In the present embodiment, the interrupt controller 110 is configured to generate an interrupt signal to switch the video decoder 101 to load the RBSP that is stored in the RBSP FIFO 109 either in check mode or in no-check mode. As an example, the interrupt signal can be an empty_interrupt signal which may be used to switch the video decoder 101 to load the RBSP that is stored in the RBSP FIFO 109 in check mode or a full_interrupt signal which may used to switch the video decoder 101 to load the RBSP that is stored in the RBSP FIFO 109 in no-check mode.

In case of the empty_interrupt signal, the interrupt controller 110 is configured to detect whether the status flags of the BSB FIFO 104 and RBSP FIFO 109 reached a predetermined empty configuration. As an example, the predetermined empty configuration can be programmed as the first flag of the BSB FIFO 104 being empty and the second flag of the RBSP FIFO 109 being almost empty. Only when the interrupt controller 110 receives the status flags of the BSB FIFO 104 and the RBSP FIFO 109, and determined the predetermined empty configuration is satisfied, the video decoder 101 can be switched to load the RBSP that is stored in the RBSP FIFO 109 in check mode. Alternatively, in case of the full_interrupt signal, the interrupt controller 110 is configured to detect whether the status flags of the BSB FIFO 104 and RBSP FIFO 109 reached a predetermined full configuration. As an example, the predetermined full configuration can be programmed as the first flag of the BSB FIFO 104 being full and the second flag of the RBSP FIFO 109 being almost full. Only when the interrupt controller 110 receives the status flags of the BSB FIFO 104 and the RBSP FIFO 109, and determined the predetermined full configuration is satisfied, the video decoder 101 can be switched to load the RBSP that is stored in the RBSP FIFO 109 in no-check mode. Further, as any skilled in the art can anticipate, the predetermined interrupt configuration can be programmed differently in order to generate the interrupt signal such that a better utilization of the BSB FIFO 104 and the RBSP FIFO 109 can be achieved.

Advantageously, by properly switching the video decoder 101 to load the RBSP that is stored in the RBSP FIFO 109 in no-check mode and thus reducing the frequency to query FIFO status with the help of the interrupt controller 110, the utilization of the BSB FIFO 104 and the RBSP FIFO 109 and thus the efficiency of the video decoder 101 can be greatly improved.

Figure 2:
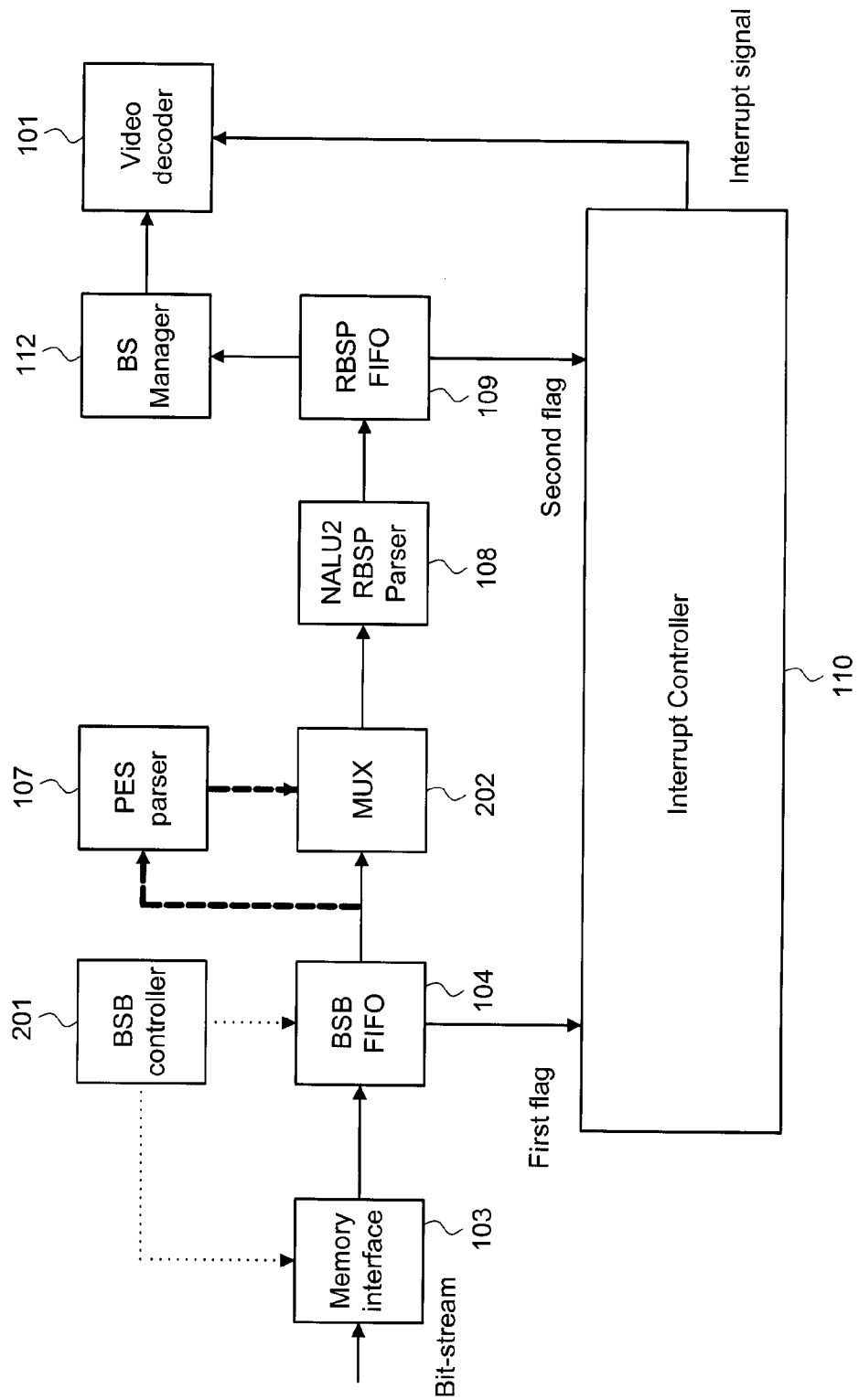
FIG. 2 is a block diagram illustrating in more detail the flow of data and control signals for the bit-stream buffer controller of FIG. 1.

FIG. 2 is a block diagram illustrating in more detail the data flow and control signals for the bit-stream buffer controller 100 of FIG. 1. Furthermore, the process manager 105 of FIG. 1 may be implemented as, for example, a BSB controller 201 and a multiplexer 202, which would be described in detail herewith.

The BSB controller 201 modulates access rate and thus the fullness status of the BSB FIFO 104. The BSB controller 201 generates a control protocol for the memory interface 103 to load the bit-stream, either in PES format or in ES format, from the external memory 102 to the BSB FIFO 104. Based on the control protocol, the BSB controller 201 suspend loading the bit-stream from the external memory 102 into the BSB FIFO 104 if the status flag of the BSB FIFO 104 has become, for example, almost full or full, and requests loading the bit-stream from the external memory 102 into the BSB FIFO 104 if the status flag of the BSB FIFO 104 has become, for example, half full, almost empty or empty.

The multiplexer 202 connects the BSB FIFO 104 or the PES parser 107 with the NALU2RBSP parser 108. As mentioned above, when the inputted bit-stream is in PES format, the multiplexer 202 will have the PES format stream that is stored in the BSB FIFO 104 to flow through the PES parser 107 to extract the ES format payload and then into the NALU2RBSP parser 108 to extract the RBSP. Alternatively, when the inputted bit-stream is in ES format, the multiplexer 202 will have the ES format bit-stream that is stored in the BSB FIFO 104 to directly flow into the NALU2RBSP parser 108 to extract the RBSP. Moreover, the PES parser 107 is configured to extract the ES format payload from the bit-stream stored in the BSB FIFO 104, and the NALU2RBSP parser 108 is configured to remove an emulation_prevention_three_byte (0*00_00_03) of the ES format payload extracted by the PES parser 107 or directly stored in the BSB FIFO 104 to extract the RBSP, which are similar to those of FIG. 1. The multiplexer 202 is configured to suspend loading the ES format payload into the NALU2RBSP parser 108 to extract the RBSP for storage in the second FIFO 109 if the status flag of the second FIFO 109 has become, for example, almost full or full, and request loading the ES format payload into the NALU2RBSP parser 108 to extract the RBSP for storage in the second FIFO 109 if the status flag of the second FIFO 109 has become, for example, half full, almost empty or empty.

The BS manager 112 reads the RBSP that is stored in the RBSP FIFO 109 and shifts out the RBSP that is stored in the RBSP FIFO 109 to the video decoder 101 according to the syntax requirement.

In addition to store the PES/ES format bit-stream and the RBSP, the BSB FIFO 104 and the RBSP FIFO 109 here are configured to register the stream for different purpose and each of these generates its own status flag, for example, empty, almost empty, half full, almost full, or full status, to indicate the fullness status thereof. The status flags of the BSB FIFO 104 and the RBSP FIFO 109 can be transmitted to and received by the interrupt controller 110 and can be used to generate an interrupt signal, for example, an_empty_interrupt signal or a full_interrupt signal, depending on a predetermined interrupt configuration, for example, a predetermined empty configuration or a predetermined full configuration, such that the video decoder 101 can be switched to load the RBSP that is stored in the RBSP FIFO 109 either in no-check mode or in check mode. Similarly, as any skilled in the art can also anticipate, the predetermined interrupt configuration can be programmed differently to generate the interrupt signal such that a better utilization of the BSB FIFO 104 and the RBSP FIFO 109 can be achieved.

Advantageous, by properly switching the video decoder 101 to load the RBSP that is stored in the RBSP FIFO 109 in no-check mode and thus reducing the frequency to query FIFO empty status with the help of the interrupt controller 110, the utilization of the BSB FIFO 104 and the RBSP FIFO 109 and thus the efficiency of the video decoder 101 can be greatly improved.

Figure 3:
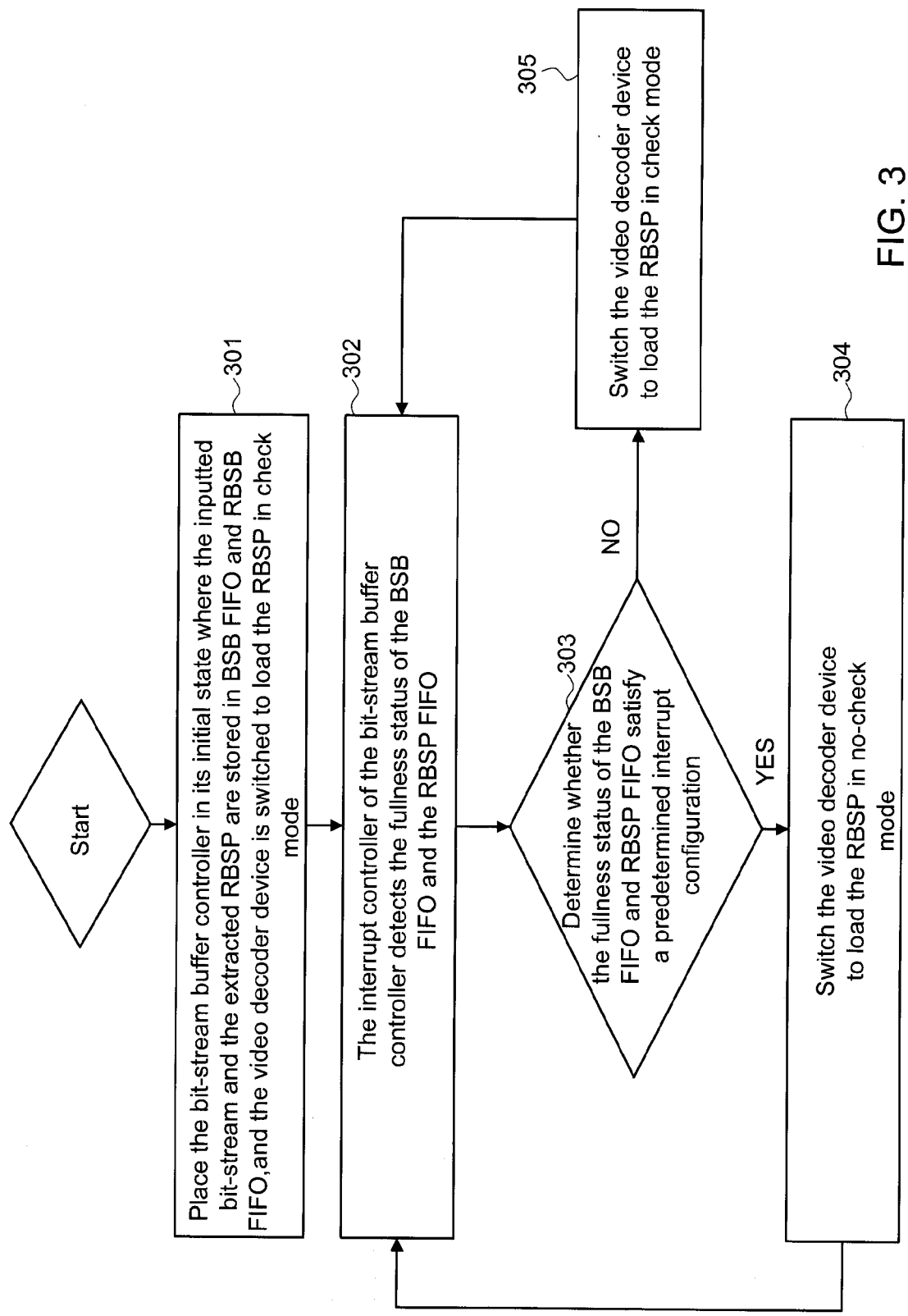
FIG. 3 is a flow chart illustrating the operation of the bit-stream buffer controller of FIG. 1.

FIG. 3 is a flow chart illustrating the operation of the bit-stream buffer controller 100 of FIG. 1.

At block 301, the bit-stream buffer controller 100 is in the initial state where the inputted bit-stream is stored in the BSB FIFO 104, the RBSP that is extracted from the inputted bit-stream is stored in the RBSP FIFO 109, and the video decoder 101 is switched to load the RBSP that is stored in the RBSP FIFO 109 in check mode, that is, the video decoder 101 has to check the fullness status flag of the RBSP FIFO 109 each time it loads the RBSP that is stored in the RBSP FIFO 109. For example, the bit-stream may be inputted through a memory interface. Moreover, the loading of the inputted bit-stream into the BSB FIFO may be suspended or requested according to the fullness status of the BSB FIFO, and the loading of the extracted RBSP into the RBSP FIFO may be suspended or requested according to the fullness status of the RBSP FIFO. Furthermore, the inputted bit-stream that is stored in the BSB FIFO 104 can be parsed to extract an ES format payload if the inputted bit-stream is in PES format, and the inputted ES format bit-stream or the extracted ES format payload extracted can be parsed to extract an RBSP for storage into the RBSP FIFO 109.

At block 302, the interrupt controller 110 of the bit-stream buffer controller 100 detects the fullness status of the BSB FIFO 104 and the RBSP FIFO 109.

At block 303, the interrupt controller 110 determines whether the fullness status of the BSB FIFO 104 and the RBSP FIFO 109 satisfy a predetermined interrupt configuration, such as a predetermined empty_interrupt configuration or a predetermined full_interrupt configuration.

Later, the video decoder 101 can be switched to load the RBSP that is stored in the RBSP FIFO 109 between check mode and no-check mode, and thus reducing the frequency to query FIFO status. For example, at block 304, the video decoder 101 is switched to load the RBSP that is stored in the RBSP FIFO 109 in check mode when the interrupt controller 110 determines the fullness status of the BSB FIFO 104 and the RBSP FIFO 109 do satisfy the predetermined interrupt configuration, and on the contrary, at block 305, the video decoder 101 is switched to load the RBSP that is stored in the RBSP FIFO 109 in no-check mode when the interrupt controller 110 determines the fullness status of the BSB FIFO 104 and the RBSP FIFO 109 do not satisfy the predetermined interrupt configuration. Similarly, the predetermined interrupt configuration may be a predetermined empty_interrupt configuration, a predetermined full_interrupt configuration, or may be programmed differently to generate the interrupt signal such that a better utilization of the BSB FIFO 104 and the RBSP FIFO 109 can be achieved Following that, the flow goes back to blocks 302 and 303 where the interrupt controller 110 of the bit-stream buffer controller 100 is configured again to detect the fullness status of the BSB FIFO 104 and the RBSP FIFO 109, and to determine whether the status flags of the BSB FIFO 104 and the RBSP FIFO 109 satisfy the predetermined interrupt configuration.

Advantageous, by properly switching the video decoder 101 to load the RBSP that is stored in the RBSP FIFO 109 between check mode and no-check mode, and thus reducing the frequency to query FIFO empty status with the help of the interrupt controller 110, the utilization of the BSB FIFO 104 and the RBSP FIFO 109 and thus the efficiency of the video decoder 101 can be greatly improved.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A system comprising:
a bit-stream buffer controller including:
   a first first-in first-out (FIFO) buffer configured to store an inputted bit-stream;
   a second FIFO buffer configured to store a payload extracted from the inputted bit-stream; and
   an interrupt controller configured to:
      track a first status flag of the first FIFO buffer and a second status flag of the second FIFO buffer; and
      generate an interrupt signal when the first and second status flags of the first FIFO buffer and the second FIFO buffer meet a predetermined condition; and
a video decoder connected with the bit-stream buffer controller, the video decoder being configured to load the payload from the second FIFO buffer in one of a first mode and a second mode of operation, wherein the video decoder checks the second status flag each time the video decoder loads the payload from the second FIFO buffer in the first mode of operation, and the video decoder loads the payload from the second FIFO buffer without checking the second status flag in the second mode of operation, the video decoder switching between the first mode of operation and the second mode of operation in response to the interrupt signal.

2. The system of claim 1, wherein the video decoder is a H.264/AVC decoder, the first FIFO buffer is a bit-stream buffer (BSB) FIFO buffer, and the second FIFO buffer is a raw byte sequence payload (RBSP) FIFO buffer.

3. The system of claim 2, wherein the bit-stream buffer controller further comprising:
a packet elementary stream (PES) parser configured to extract an elementary stream (ES) format payload from the inputted bit-stream stored in the BSB FIFO buffer when the inputted bit-stream is in a PES format; and
a NALU2RBSP parser configured to extract a RBSP from the ES format bit-stream outputted by the PES parser when the inputted bit-stream is in PES format, or to extract the RBSP from the ES format bit-stream stored in the BSB FIFO buffer when the inputted bit-stream is in a ES format.

4. The system of claim 2, wherein the bit-stream buffer controller further comprising:
a process manager configured to control the loading of the inputted bit-stream into the BSB FIFO buffer and the RBSP FIFO buffer.

5. The system of claim 4, wherein the process manager comprises:
a BSB controller configured to suspend loading of the inputted bit-stream into the BSB FIFO buffer and request loading of the inputted bit-stream into the BSB FIFO buffer according to the first status flag of the BSB FIFO buffer; and
a multiplexer configured to suspend loading of the extracted RBSP into the RBSP FIFO buffer and request loading of the extracted RBSP into the RBSP FIFO buffer according to the second status flag of the RBSP FIFO buffer.

6. The system of claim 2, wherein the bit-stream buffer controller further comprising:
a memory interface connecting the inputted bit-stream for storage in the BSB FIFO buffer.

7. The system of claim 2, wherein the bit-stream buffer controller further comprising:
a bit stream (BS) manager configured to shift out the RBSP according to a syntax requirement.

8. The system of claim 2, wherein the interrupt signal causes the video decoder to switch to the first mode of operation when the first and second status flags of the BSB FIFO buffer and the RBSP FIFO buffer substantially meet an empty condition.

9. A method of controlling access to a bit-stream buffer from a video decoder, comprising:
receiving an inputted bit-stream and storing the inputted bit-stream in a first FIFO buffer;
extracting a payload from the inputted bit-stream and storing the payload in a second FIFO buffer;
generating an interrupt signal when a first status flag of the first FIFO buffer and a second status flag of the second FIFO buffer meet a predetermined condition; and
in response to the interrupt signal, causing a video decoder to switch from a first mode of operation to a second mode of operation, wherein the video decoder checks the second status flag each time the video decoder loads the payload from the second FIFO buffer in the first mode of operation, and the video decoder loads the payload from the second FIFO buffer without checking the second status flag in the second mode of operation.

10. The method of claim 9, wherein the video decoder is a H.264/AVC decoder, the first FIFO buffer is a BSB FIFO buffer, and the second FIFO buffer is a RBSP FIFO buffer.

11. The method of claim 10, the method further comprising:
extracting an ES format payload from the inputted bit-stream that is stored in the BSB FIFO when the inputted bit-stream is in a PES format; and
extracting a RBSP from the inputted ES format bit-stream or the extracted ES format payload for storage in the RBSP FIFO buffer.

12. The method of claim 10, further comprising:
suspending loading of the inputted bit-stream into the BSB FIFO buffer and requesting loading of the inputted bit-stream into the BSB FIFO buffer according to a first status flag of the BSB FIFO buffer; and
suspending loading of the RBSP into the RBSP FIFO buffer and requesting loading of the RBSP into the RBSP FIFO buffer according to the second status flag of the RBSP FIFO buffer.

13. The method of claim 10, further comprising:
receiving the inputted bit-stream through a memory interface.

14. The method of claim 10, further comprising:
outputting the extracted RBSP according to a syntax requirement to the video decoder.

15. The system of claim 2, wherein the interrupt signal causes the video decoder to switch to the second mode of operation when the first and second status flags of the BSB FIFO buffer and the RBSP FIFO buffer substantially meet a full condition.

16. The method of claim 9, wherein the interrupt signal is generated when the first and second status flags substantially meet a full condition.

17. The method of claim 16, wherein the full condition is met when one of the first and second status flags indicates a full status, and the other one of the first and second status flags indicates at least an almost full status.

18. The method of claim 9, further comprising:
generating a second interrupt signal when the first status flag of the first FIFO buffer and the second status flag of the second FIFO buffer meet a predetermined second condition; and
in response to the second interrupt signal, causing the video decoder to switch from the second mode of operation to the first mode of operation.

19. The method of claim 18, wherein the second interrupt signal is generated when the first and second status flags substantially meet an empty condition.

20. The method of claim 19, wherein the empty condition is met when one of the first and second status flags indicates an empty status, and the other one of the first and second status flags indicates at least an almost empty status.

* * * * *